(12) United States Patent
Kiesbauer et al.

(10) Patent No.: US 9,046,185 B2
(45) Date of Patent: Jun. 2, 2015

(54) METHOD FOR DETERMINING AN OPERATING POSITION OF AN OPEN/CLOSED-VALVE AND FIELD DEVICE

(75) Inventors: Joerg Kiesbauer, Eppertshausen (DE); Stefan Unland, Offenbach (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 645 days.

(21) Appl. No.: 13/088,809

(22) Filed: Apr. 18, 2011

(65) Prior Publication Data
US 2011/0252895 A1    Oct. 20, 2011

(30) Foreign Application Priority Data
Apr. 20, 2010    (DE) .................. 10 2010 015 647

(51) Int. Cl.
*F15B 15/28* (2006.01)
*F16K 37/00* (2006.01)

(52) U.S. Cl.
CPC .......... *F16K 37/0091* (2013.01); *F15B 15/2838* (2013.01)

(58) Field of Classification Search
CPC ............ F16K 37/0041; F16K 37/0083; F16K 31/124; F16K 31/128
USPC ........... 137/488, 489, 490, 491, 489.3, 489.5, 137/492, 492.5, 553, 554, 557; 251/30.01, 251/30.02, 30.03, 30.04, 30.05; 73/1.79, 73/1.81; 91/20–27, 171, 189 R, 91/358 R–358 A, 392–410, 419
See application file for complete search history.

(56) References Cited

U.S. PATENT DOCUMENTS

| | | | | |
|---|---|---|---|---|
| 4,523,286 A | * | 6/1985 | Koga et al. ................... | 702/183 |
| 5,587,536 A | * | 12/1996 | Rasmussen .................... | 73/744 |
| 5,666,806 A | * | 9/1997 | Dietz ............................ | 60/327 |
| 6,356,811 B1 | * | 3/2002 | Beselt ........................... | 700/301 |
| 7,621,293 B2 | * | 11/2009 | Snowbarger .................. | 137/487.5 |
| 2005/0043911 A1 | | 2/2005 | Hoffmann et al. | |
| 2008/0236383 A1 | * | 10/2008 | Matsumoto et al. ............. | 92/10 |
| 2010/0050786 A1 | | 3/2010 | Kiesbauer et al. | |

FOREIGN PATENT DOCUMENTS

| | | |
|---|---|---|
| DE | 10320031 A1 | 12/2004 |
| DE | 102008045775 A1 | 3/2010 |

\* cited by examiner

*Primary Examiner* — William McCallister
(74) *Attorney, Agent, or Firm* — Schiff Hardin LLP

(57) ABSTRACT

In a method or field device for determining a position of an open/closed-valve positioned by a pneumatic actuating drive and movable to a completely opened open position and a closed position depending on operating requirements, during normal operation a pneumatic working chamber of the actuating drive is pneumatically influenced with an i/p converter such that the open/closed-valve moves to one of the open/closed positions and, in case of a predetermined operating condition, the i/p converter allows the working chamber to vent so that the open/closed valve automatically moves to the other one of the open/closed positions. At least one of pressure prevailing in the working chamber and pneumatic control pressure output at the i/p converter is captured continuously over time, thus obtaining a pressure change over time on the basis of which a physical operational variable of the open/closed-valve is determined.

17 Claims, 3 Drawing Sheets

METHOD FOR DETERMINING AN OPERATING POSITION OF AN OPEN/CLOSED-VALVE AND FIELD DEVICE

BACKGROUND

The preferred embodiment relates to a method for determining an operating position of an open/closed-valve positioned by a pneumatic actuating drive. The so-called open/closed-valve is generally also referred to as a safety valve that, in most designs, can adopt a completely closed or completely opened position in which the working chamber of the pneumatic actuating drive is pneumatically loaded. Upon complete loading of the working chamber the pneumatic working pressure pushes a working piston of the actuating drive against a force accumulator, such as a compression spring, into a predetermined abutment position, the force accumulator attempting to push a valve member of the open/closed-valve either into the completely opened position or the completely closed position.

The valve member is rigidly coupled to the working piston via a pivoting and/or translational mechanism, in particular via an actuating shaft or actuating rod. If an unforeseen emergency situation occurs, a plainly working plant field device without actuation control or position control, comprised of the pneumatic actuating drive and the open/closed-valve, in particular for a petrochemical plant, a large chemical plant, a pharmaceutical plant, a plant for steel and cement production, a waste incineration plant, foundries, etc., namely an IP converter pneumatically coupled to the working chamber of the actuating drive, causes a pressure release or venting of the working chamber of the pneumatic actuating drive. Thus the stored potential spring energy is released within the pneumatic actuating drive, and the valve member of the open/closed-valve is moved to the safety position.

In view of a guarantee for high operational safety required by the plant operator, it is necessary to regularly check functionality of such plant field devices or safety valves. In this check it is to be established whether and how the valve member actually moves into the safety position as a result of the emergency venting of the pneumatic actuating drive, and/or whether, for example, it remains for too long or even indefinitely in its departure position as a result of adhesion from long-term wear.

It is known to check the predetermined safety position of the open/closed-valve by means of an, in particular electrical, so-called position signal transducer that will output a respective electrical position signal only upon adoption of the safety position, and thus signals the expected adoption of the safety position. It emerged that in order to guarantee a high functional safety of the open/closed-valve, it is necessary to know the displacement over time to the safety position. If, for example, the adoption of a predetermined safety position is much delayed, this could be an indication of a prevailing or at least a beginning of wear and tear damage of the plant field device, which damage might affect all or only some particular mechanical or electrical functional components of the plant field device.

For known plant field devices with an exclusive open/closed-valve functioning, mechanical sensing devices are used for capturing the position of the valve member, which devices realize a direct sensing of the position at the valve member or a component of the actuating mechanism of the open/closed-valve of the actuating drive rigidly coupled to the valve member. In view of a high examination precision of the open/closed-valve or the actuating drive it is desirable to position a position sensing device as near as possible to the valve member in order to exclude a faulty position determination due to the failure of a coupling member of the mechanical chain between the actuating drive and the valve member. A disadvantage of this proximal, direct position sensing is that many of such plant field devices with a simple open/closed-valve function are to be used in technical process plants where stringent explosion protection regulations are to be abided with. An electrical potential in the vicinity of a plant process fluid at risk of explosion must be minimized, if not totally avoided. Furthermore, when disposing the position sensing device in the vicinity of the valve member, a frequent temperature change may have a negative effect on the measurement results insofar as the position sensors are usually adjusted and calibrated at room temperature prior to their delivery to the customer. During application at the ducts carrying the process medium usually much higher or lower temperatures prevail so that the sensors are to be readjusted with some expenditure.

SUMMARY

It is an object to provide an improved option for a diagnosis of the adoption of a predetermined position of an open/closed-valve, wherein the respective expenditure for meterology and mechanical installations is to be kept low and a conclusive, reliable statement concerning the actual position of the valve member of the open/closed-valve can be made by using at most one single electronic sensing device.

In a method or field device for determining a position of an open/closed-valve positioned by a pneumatic actuating drive and movable to a completely opened open position and a closed position depending on operating requirements, during normal operation a pneumatic working chamber of the actuating drive is pneumatically influenced with an i/p converter such that the open/closed-valve moves to one of the open/closed positions and, in case of a predetermined operating condition, the i/p converter allows the working chamber to vent so that the open/closed valve automatically moves to the other one of the open/closed positions. At least one of pressure prevailing in the working chamber and pneumatic control pressure output at the i/p converter is captured continuously over time, thus obtaining a pressure change over time on the basis of which a physical operational variable of the open/closed-valve is determined.

DESCRIPTION OF THE PREFERRED EMBODIMENT

Figure 1:
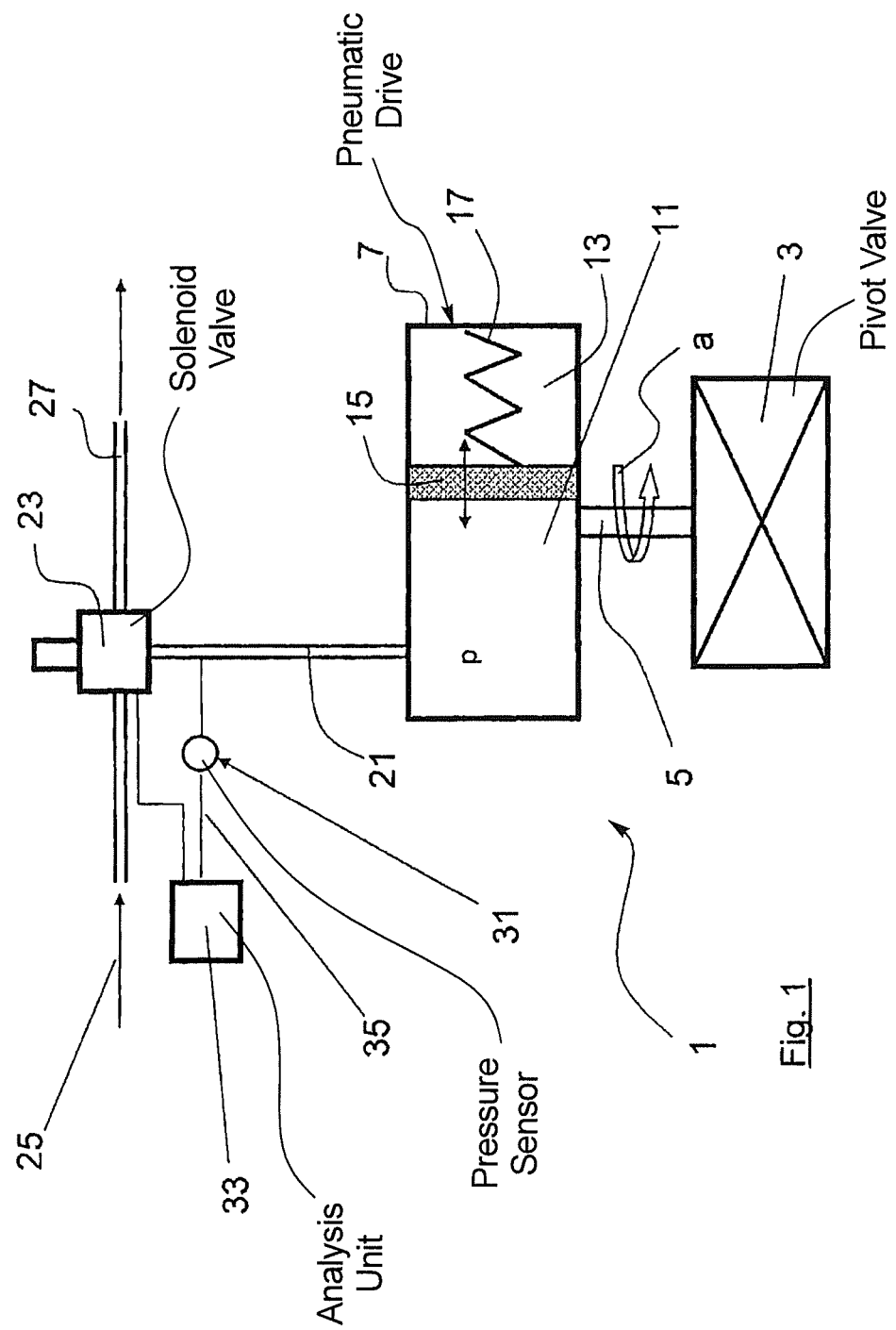
FIG. 1 is a schematic drawing of a field device according to the preferred embodiment.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated embodiment and such further applications of the principles of the invention as illustrated as would normally occur to one skilled in the art to which the invention relates are included.

A method is provided for determining an operating position of an open/closed-valve actuated by a pneumatic actuating drive. The pneumatic actuating drive is preferably a pivot drive, but a translational actuating drive may also be used. The plant field device comprised of the pneumatic actuating drive and the open/closed-valve is used in a technical process plant such as a petrochemical plant, a large chemical plant, a pharmaceutical plant, a plant for steel or cement production, a waste incineration plant, foundries or the like. The predetermined functionality of the open/closed-valve with or without additional position control exclusively permits a completely opened open position and a completely closed closed position in which a valve member blocks a flow through a valve seat in a process fluid line of the plant.

The process fluid to be processed in the plant may be explosive so that high electrical potentials in its vicinity must be avoided or at least be kept vanishingly low. During normal operation of the pneumatic actuating drive a working chamber of the drive is loaded pneumatically via an i/p converter so that the open/closed-valve moves to one of the two open/closed positions.

Preferably this is the completely open position. In case of a predetermined operating condition, in particular an emergency situation, such as a power failure, in particular in the respective part of the plant, the i/p-converter vents the working chamber, in particular to atmospheric pressure, so that the open/closed-valve moves to the other open/closed position.

Preferably, this is the completely closed position. According to the preferred embodiment, the functionality of the open/closed-valve, including the pneumatic actuating drive, shall be diagnosed by continuously capturing over time the pneumatic pressure prevailing in the working chamber and/or the pneumatic control pressure output at the i/p-converter. It became apparent that the captured pressure change over the course of time is a metrological measure for a physical displacement variable of the open/closed-valve, in particular concerning in how far the open/closed-valve has, as expected, reached one open/closed position from the other one, how long it took until the open/closed-valve reached the respective open/closed position counting from the first change of the pneumatic supply pressure in the working chamber (displacement time or running time of the open/closed-valve), and/or which total actuating path the open/closed-valve has covered since the first pressure change. The displacement time can provide a definitive conclusion with respect to, whether, for example, an impermissible wear has occurred at the actuating device. Also the displacement distance can diagnostically be used to check whether the desired open/closed position has actually been adapted or not.

Surprisingly, direct conclusions can be drawn on the position of the open/closed-valve as well as on the course of its position over time, based on the captured pressure changes over time. On the basis of this conclusion a reliable diagnostic statement can be made with respect to the functionality of the open/closed-valve upon adoption of any desired position. This is because the preferred embodiment utilizes a finding that the decrease of the pneumatic working pressure in the working chamber as well as the increase of the working pressure represent a characteristic, reliable measurement parameter, before all, specific to the plant field device or the valve, through which positive statements concerning position or travel distance as well as deviations from the expected position over time can be identified. In order to move the valve member into one of the open/closed positions, displacement resistances are to be overcome resulting in particular from the friction of the actuating mechanism inherent to the field device or from the flow forces of the process fluid of the technical process plant, prevailing at the valve member, that may impede or enhance a displacement of the open/closed-valve. It became apparent that for most of the open/closed-valves the resistance forces can be standardized or abstracted insofar as a predeterminable amount of force, dependent on the position of the valve member, is necessary in order to move the valve member of the open/closed-valve between the open/closed positions back and forth.

It is the pneumatic pressure prevailing in the working chamber and being captured there that represents the actual necessary amount of force for overcoming the resistance force representing the state of the plant field device. According to the preferred embodiment, it is determined whether a usual and expected, and thus known amount of force must be generated or not in order to achieve the position change of the open/closed-valve. Should a pressure be captured exceeding this value, then a damage of the field device, in particular of the positioning mechanism of the positioning actuating drive and/or the open/closed-valve, or an impermissible friction increase due to wear has to be assumed with a high probability. If a pneumatic pressure is captured that is much lower than the expected pressure, then, for example, a breakage of an actuating rod between the actuating drive and the valve member is present. The captured negative and positive pressure can trigger the output of an error signal by the analysis circuitry.

For example, the pressure change over time during the pneumatic pressurizing of the working chamber, thus, during the displacement into the operating position of the open/closed-valve, can be identified. Alternatively or additionally, the pressure pattern over time can be identified during the venting in order to check the mechanism of the displacement of the open/closed-valve.

In the preferred embodiment of the invention, the open/closed-valve has exclusively a completely opened open position and a completely closed close position without further individually controllable intermittent positions. A position control is not provided in the method according to the preferred embodiment. Preferably, the pattern over time of the captured actual pressure changes is compared with an expected pressure pattern over time based on valve specific empirical values, preferably of a faultlessly working average open/closed-valve. In case of a deviation of a captured actual pressure change from the expected pressure pattern, an error signal can be generated and in particular be displayed. This comparison of values can be performed in direct vicinity to the field device, in particular in the open/closed-valve, preferably within the housing of the pneumatic actuating drive or within an encapsulating housing attached to the actuating drive housing of the pneumatic actuating drive. The comparison of values can, however, also be performed at the distant control room. Preferably, a predetermined tolerance of deviation is defined for the captured actual pressure pattern with respect to the previously stored expected pressure pattern, wherein the exceeding of the predetermined tolerance of deviation by the captured actual pressure triggers an error signal.

Figure 2:
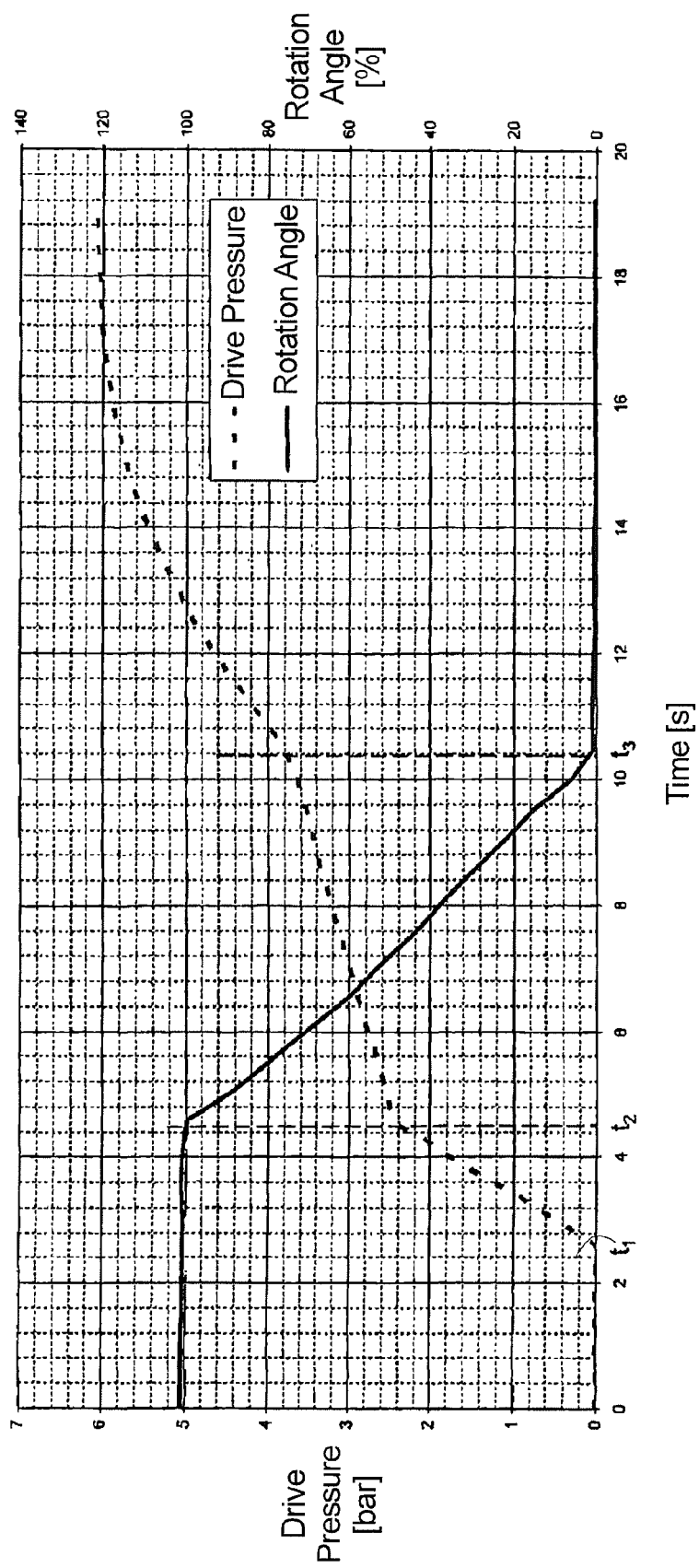
FIG. 2 is a graph in which the captured drive pressure over time is compared to the rotation angle of a pneumatic pivot drive over time, wherein the pneumatic pivot drive receives an air supply.
Figure 3:
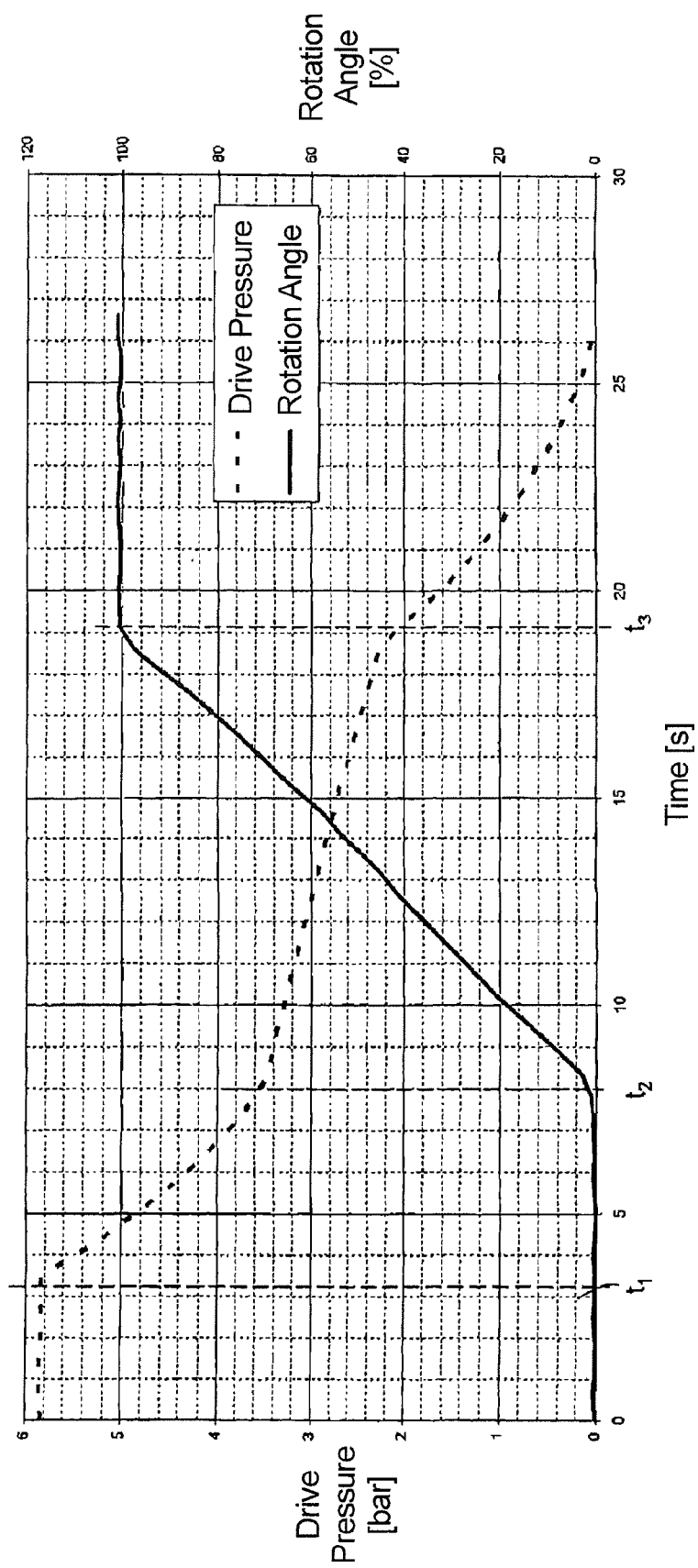
FIG. 3 is a graph in which the drive pressure over time is compared to the rotation angle over time while the pneumatic pivot drive is vented.

Furthermore, the pressure values, in particular the path of pressure changes over time can be used to determine the momentary position of the open/closed-valve during the movement into the respective position, which is easily comprehensible upon consulting FIGS. 2 and 3.

In the preferred embodiment of the invention, the capturing of the pneumatic pressure over time, in particular a functional diagnosis of the open/closed-valve, is initiated when a pressure change, in particular a pressure drop and/or a rise in pressure is captured. The diagnosis is initiated automatically upon capturing the pressure change.

In the preferred embodiment of the invention, the position change, in particular the momentary position per unit time of the open/closed-valve based on the captured pressure change is calculated and derived. Prior to in fact determining the position change, in particular the momentary position of the open/closed-valve, in particular the captured pressure change is checked as to whether or not it is within the predetermined tolerance of deviation with respect to the predetermined expected pressure pattern. In particular only in the case that the captured pressure change is within the predetermined tolerance of deviation, the position change, in particular the momentary position of the open/closed-valve is determined.

In the preferred embodiment of the invention, the position information derived via the captured pressure change is used to apply a position control routine to the pneumatic actuating drive. Therein a subsequent adjustment of the pneumatic pressure or the supply pressure within the pneumatic working chamber of the actuating drive can be provided. It is in particular to be noted that for this position control no directly captured position signal, for example from a HALL-sensor are required.

In a further development of the invention, a diagnosis on the functionality of the mechanism of the open/closed-valve is initiated by comparing the actual course of the pressure change with an expected course of the pressure change.

Preferably, the method of the preferred embodiment is performed without a direct position capturing of the open/closed-valve, for example without a device for sensing the position change of a component of the actuating mechanism, such as a HALL-sensor.

In a further development of the preferred embodiment, a test signal that is independent from the normal operation and the predetermined operation position is transmitted to the i/p-converter, the signal initiating a partial displacement of the open/closed-valve from the one into the other open/closed position (partial stroke) and back again into the original position, in order to check in particular the functionality of the field device, preferably the open/closed-valve.

In the preferred embodiment, an evaluation of the pressure-time curve as well as the derivative over time of the determined working pressure is used to determine an operating point or an optimum working range of the pneumatic actuating drive. This operating point or working range can also be determined by determining a response time or response pressure, that is a point in time or an actuating pressure from which onwards a certain displacement of the final control element, in particular the beginning of a displacement from a rest position is achieved by the actuating drive.

Furthermore, the preferred embodiment relates to a field device of a technical process plant such as a petrochemical plant or the like. The field device comprises in particular an above described open/closed-valve according to the preferred embodiment, a pneumatic drive operating the open/closed-valve and an i/p-converter that during normal operation of the plant pneumatically impinges on a pneumatic working chamber of the drive in such a way that the open/closed-valve moves to one of the open/closed positions. In case of a certain operating condition, in particular in an emergency situation, the i/p-converter vents the working chamber such that the open/closed-valve moves into the other one of the open/closed positions. According to the preferred embodiment, the field device is provided with a pressure sensor for capturing continuously over time the pneumatic pressure prevailing in the working chamber and/or the control pressure output at the i/p-converter. Furthermore, the field device according to the preferred embodiment has an analysis unit that captures a pressure change over the course of time and uses the captured pressure change pattern to determine a physical procedural variable, preferably the position, the displacement time or duration, the travel distance or the like of the open/closed-valve. With the determined position a diagnosis for the correct functioning of the actuating drive and/or the control valve can be performed.

Preferably the pneumatic actuating drive has a force storing device such as an air cushion, a positioning spring or the like. Therein it is to be noted that the field device according to the preferred embodiment can also be applied to a so-called double acting actuating drive with two pneumatically loadable positioning chambers. In this case, the force accumulation device can be formed from one of the pneumatic working chambers.

Preferably, the force accumulation unit is preloaded, in particular the actuating spring is pre-tensioned and pushes in the pre-operating condition the open/closed-valve into the other one of the open/closed position.

In the preferred embodiment of the invention the pressure sensor is disposed outside the working chamber of the actuating drive adjacent to the output of the i/p-converter, in particular in a connecting line that pneumatically couples the working chamber with the output. Alternatively, the pressure sensor can also be disposed inside the housing, in particular in the working chamber of the actuating drive.

In the preferred embodiment of the invention, the analysis unit is disposed inside a preferably encapsulated, separate housing flange mounted to the housing of the actuating drive.

In a particularly preferred embodiment of the invention, the field device is not provided with a means for directly capturing the position of the open/closed-valve. This means that there is no device provided at the field device that provides for a direct sensing of the position of a component of the actuating mechanism of the open/closed-valve for the actuating drive. In particular, no HALL-sensor is used.

Preferably, the analysis unit executes a test sequence by performing a partial stroke procedure in order to check the functionality of the open/closed-valve.

In a partial stroke procedure the working chamber of the actuating drive is only partially vented in order to move the valve member out of its initial position only for a portion of the displacement path and not letting it completely open or close. The partial movement is subsequently determined via the pressure change sensing within the pneumatic drive.

In the preferred embodiment of the invention, the field device according to the invention comprises with respect to its electronic components the i/p-converter, the pressure sensor, (in particular for generating an electrical measurement signal representing the pressure) and a circuit for the evaluation unit. Only in exceptional cases could the evaluation unit be additionally provided with a control algorithm or controller in order to generate a position adjustment signal independent from the captured pressure signal in order to enhance or weaken the pneumatic pressure within the working chamber for the desired open/closed position, if applicable. For this purpose a direct position sensor could also be provided.

Further characteristics, advantages and features of the preferred embodiment of the invention become apparent by means of the following description of the preferred embodiment in conjunction with the drawing Figures.

In FIG. 1 a field device according to the preferred embodiment is generally given the reference numeral 1. The simple field device 1 has a pivot valve 3 formed as an open/closed-valve. The pivot valve 3 is actuated by a pivot shaft 5 that is pivotingly operated by a pneumatic pivot drive 7, which is indicated by arrow a. The pneumatic drive 7 has a pneumatic working chamber 11 separated in a fluid-tight manner from a mechanical working chamber 13 by a piston 15 that is displaceable back and forth. A compression spring 17 is disposed in the mechanical working chamber 13 attempting to push the piston 15 into a safety position in which the pivot valve 3 is moved into the safety position in order to completely close a fluid line of the plant not shown in detail.

A pneumatic connection line 21 is coupled to the working chamber 11, the connection line connecting the pneumatic chamber 11 with a solenoid valve 23, namely an i/p-converter. The solenoid valve 23 is connected to a pneumatic supply energy 25, for example a 6 bar air pressure supply. An outgoing line 27 is connected to the solenoid valve (i/p-converter), being exposed to atmospheric pressure (1 bar).

A pneumatic pressure sensor 31 reaches into the connecting line 21 and captures the pneumatic pressure within the connection line 21 and thus the working chamber 11. The pressure sensor 31 is coupled to an analysis unit 33 via an electric signal line 35. The analysis unit 33 comprises an encapsulated housing in which electronic components are disposed. The electronic components may be designed to carry out a control routine with respect to the position of the pivot valve.

In the following the functionality of the field device 1 according to the preferred embodiment is explained.

During normal operation the solenoid valve 23 is configured such that the pneumatic operating pressure p is present inside the pneumatic working chamber 11. The pneumatic operating pressure p causes the piston 15 to move translationally, whereby the volume of the pneumatic working chamber 11 increases while at the same time the volume of the mechanic working chamber 13 being connected to atmospheric pressure, decreases. At the same time the compression spring 17 is compressed. In a balance of forces between the compression force of the compression spring 17 and the pneumatic compression force in the pneumatic working chamber 11 a predetermined open position of the pivot valve is reached under normal operating conditions. The pneumatic pressure is then sensed by the pneumatic pressure sensor 31 as a constant pressure.

In the case of an emergency situation that is either deliberately initiated for test reasons or actually prevailing, the solenoid valve 23 opens the outgoing line 27 whereby the pneumatic working chamber 11 is vented. During the venting process the pressure change within the pneumatic connection line 21 is captured over time by the pressure sensor 31 and is recorded in the evaluation unit 33. The evaluation unit 33 may comprise a storage unit for storing the captured pressure changes. The evaluation unit 33 compares the pressure changes over time with a previously determined pattern of expected pressure changes. The expected pressure change pattern is comprised of previously determined values, in particular specific to the actuating device, representing the pressure changes over time upon venting for a correctly functioning field device. If the actually determined path of the venting pressure does not coincide with the expected path of pressure changes it can be assumed that the mechanism of the pivot valve as well as of the pneumatic drive do not function correctly. In this case, an error signal can be output that may evoke a detailed mechanical functionality check of the field device.

A diagnosing procedure by means of capturing the pressure change over time according to the preferred embodiment can also be used when pressurizing the pneumatic working chamber 11. For this purpose, the pneumatic working chamber 11 is exposed to the pneumatic operating pressure, which is captured over time by the pressure sensor. The captured path of the pressure change can again be compared with an expected path of pressure change for pressurizing the pneumatic pivot drive. If the actual pressure change pattern falls outside a tolerance range, a malfunctioning, in particular of the actuating mechanism of the pneumatic pivot drive 7, is to be assumed.

It is to be understood that the captured pressure values may at the same time allow a conclusion on the position of the pivot valve 3. In order to readjust a certain position, if required, the measured pressure values may be used as a control variable.

For the measurement presented in FIG. 2 the pressurizing phase starts after about two or three seconds, which is easily recognizable by the kink at $t_1$ of the dashed line, representing the drive pressure. After the start of pressurizing, the drive pressure continuously increases, in particular with a constant slope. Up to the time $t_2$ the drive pressure does not yet suffice to overcome the spring force of the compression spring 17. From the time $t_2$ the drive pressure brings the pivot valve from the closed position essentially constantly and gradually into the open position, which is recognizable by the straight path of the full line representing the rotational angle. With the decrease of the rotation angle from time $t_2$ onwards, the slope of the drive pressure curve suddenly decreases in $t_2$ because a pressure increase up to $t_2$ when the piston 15 was still stationary is no longer possible due to the displacement of the piston 15. At the time $t_3$ the pivot valve reaches the open position, which is indicated by the rotation angle position of 0%. At this point in time $t_3$, the slope of the drive pressure is rising again because the volume of the pneumatic working chamber 11 cannot increase anymore.

The path of the drive pressure during pressurizing shown in FIG. 2 is characterizing the device to such an extent that, surprisingly, it can be used to check the functionality of the field device. If during capturing of the pressure change, an impermissible deviation determinable by empirical values be present, a malfunctioning of the field device is to be assumed, which may be indicated by an output of an error signal.

In FIG. 3 the path of the drive pressure is represented in comparison to the rotation angle in the time scale for venting. Here also three characteristic points in time $t_1$ to $t_3$ occur.

The venting process starts after about three seconds, which is visible by the first kink of the dashed line representing the drive pressure. With a steady decrease of the drive pressure down to 4 bars, the spring force stored in the compression spring does not yet suffice to displace the piston 15, which is the reason why the rotation angle remains at 0% for up to eight seconds. Only when falling below about 3.5 bars at the time of $t_2$ (eight seconds), the spring force of the compression spring is sufficient to displace the piston 15, which is evident by the steadily increasing curve of the rotational angle. At the same time the slope of the drive pressure curve decreases because due to the displacement of the piston, a pressure decrease is not possible anymore to the same extent as for a stationary piston 15.

At the moment when the piston 15 is pushed into the state in which the open/closed-valve is in a closed position, the rotation angle reaches 100%, namely at about 19 seconds. Resulting from the piston 15 being now stationary, the drive pressure decreases more again.

Also the path of the drive pressure as represented in FIG. 3 represents a characteristic parameter scale, specific to the actuating device, with which the functionality of the field device can be checked. Owing to the clear attribution of the drive pressure changes at the time $t_1$, $t_2$ and $t_3$ to rotational angle positions, a positive, even if indirect, statement can be made about the position of the open/closed-valve.

Although a preferred exemplary preferred embodiment and some variations thereof are shown and described in detail in the drawings and in the preceding specification, they should be viewed as purely exemplary and not as limiting the invention. It is noted that only a preferred exemplary embodiment and some variations thereof are shown and described, and all variations and modifications that presently or in the future lie within the protective scope of the invention should be protected.

We claim as our invention:

1. A method for determining a position of an open/closed-valve positioned by a pneumatic actuating drive and movable to a completely opened open position and a closed position depending on operating requirements, comprising the steps of:

during normal operation the actuating drive pneumatically influencing with an i/p converter a pneumatic working chamber of the actuating drive such that the open/closed-valve moves to one of the open/closed positions and, in the case of a predefined operating condition, the i/p-converter allowing the working chamber to vent so that the open/closed-valve automatically moves to the other one of the open/closed positions;

capturing at least one of the pressures selected from a group consisting of a pressure prevailing in the working chamber and a pneumatic control pressure output at the i/p converter continuously over time; and determining a pressure change over time which defines a pressure versus time pattern, wherein said pressure versus time pattern of the pressure change is compared to an expected pressure pattern based on saved empirical values of a faultlessly working open/closed-valve, and in case of exceeding a predetermined deviation tolerance of the pressure versus time pattern with respect to the expected pressure pattern an error signal is generated.

2. The method of claim 1 wherein said predefined operating condition comprises an emergency situation.

3. The method according to claim 1 wherein the capture of the at least one pressure is initiated when a change of a constant pressure prevailing inside the pneumatic working chamber is captured.

4. The method according to claim 1 wherein based on the pressure change, a position change comprising a momentary position per unit time of the open/closed-valve is derived, wherein beforehand the captured pressure change is checked as to whether or not it is within a predetermined tolerance of deviation with respect to an expected pressure pattern based on stored empirical values, and in case that the captured pressure change is within the deviation tolerance, a derivation of the position change of the open/closed-valve is performed.

5. The method according to claim 1 wherein a diagnosis of a functionality of a motion mechanism of the open/closed-valve is initiated by comparing a captured actual pressure pattern with an expected pressure pattern.

6. The method according to claim 1 wherein the method is executed without directly capturing a position of the open/closed-valve and thus without having a device for sensing the position change on a component of the actuation mechanism.

7. The method according to claim 1 wherein a test signal independent from normal operation and from a predetermined operating position is transmitted to the i/p-converter inducing a partial movement of the open/closed-valve from the one to the other open/closed position and back to the one initial position in order to check a proper functioning of the open/closed-valve.

8. The method according to claim 1 wherein on the basis of the determined pressure change over time the pressure change is differentiated with respect to the time in order to determine an operating point or optimum working range of the pneumatic actuating drive.

9. A field device of a technical process plant, comprising:

an open/closed-valve;

a pneumatic actuating drive actuating the open/closed-valve;

an i/p-converter which during normal operation of the plant pneumatically influences a pneumatic working chamber of the actuating drive in such a way that the open/closed-valve moves to one of the open/closed positions and in the case of a predetermined operating condition the i/p-converter vents the working chamber so that the open/closed-valve moves to the other one of the open/closed positions;

a pressure sensor capturing continuously over time at least one of the pressures selected from a group consisting of a pneumatic working pressure prevailing in the working chamber and a pneumatic control pressure output at the i/p-converter; and an analysis unit determining a pressure change over time which defines a pressure versus time pattern, wherein said pressure versus time pattern of the pressure change is compared to an expected pressure pattern based on saved empirical values of a faultlessly working open/closed-valve, and in case of exceeding a predetermined deviation tolerance of the pressure versus time pattern with respect to the expected pressure pattern an error signal is generated.

10. The field device of claim 9 wherein said predetermined operating condition comprises an emergency situation.

11. The field device according to claim 9 wherein the actuating drive has a force accumulator comprising an air cushion or an actuating spring that is preloaded and thus pre-tensioned during normal operation and which pushes the open/closed-valve in said predetermined operating condition to the other one of the open/closed positions.

12. The field device according to claim 9 wherein the pressure sensor is arranged outside the pneumatic working chamber of the drive adjacent to the output of the i/p-converter in a connecting duct coupling the working chamber to the output.

13. The field device according to claim 9 wherein the field device does not directly capture the position of the open/closed-valve and is not provided with a device for directly sensing a position of a component of the actuation mechanism of the open/closed-valve or the actuating drive.

14. The field device according to claim 9 wherein the analysis unit is designed to perform a partial-stroke-procedure in order to check a functionality of the open/closed-valve.

15. The field device according to claim 9 wherein with respect to electronic components, the field device exclusively consists of the i/p-converter, the pressure sensor for generating an electric pressure signal, and the analysis unit.

16. A method for determining a position of an open/closed-valve positioned by a pneumatic actuating drive and movable to an opened open position and a closed position depending on operating requirements, comprising the steps of:

during normal operation the actuating drive pneumatically influencing with a controllable pressure converter a pneumatic working chamber of the actuating drive such that the open/closed-valve moves to one of the open/closed positions and, in the case of a predefined operating condition, the controllable pressure converter allowing the working chamber to vent so that the open/closed-valve automatically moves to the other one of the open/closed positions;

capturing at least one of the pressures selected from a group consisting of pressure prevailing in the working chamber and a pneumatic control pressure output at the controllable pressure converter over time; and determining a pressure change over time which defines a pressure versus time pattern, wherein said pressure versus time pattern of the pressure change is compared to an expected pressure pattern based on saved empirical values of a faultlessly working open/closed-valve, and in case of exceeding a predetermined deviation tolerance of the pressure versus time pattern with respect to the expected pressure pattern an error signal is generated.

17. A field device of a technical process plant, comprising:
an open/closed-valve;
a pneumatic actuating drive actuating the open/closed-valve;
a controllable pressure converter which during normal operation of the plant pneumatically influences a pneumatic working chamber of the actuating drive in such a way that the open/closed-valve moves to one of the open/closed positions and in the case of a predetermined operating condition the controllable pressure converter vents the working chamber so that the open/closed-valve moves to the other one of the open/closed positions;
a pressure sensor capturing continuously over time at least one of the pressures selected from a group consisting of a pneumatic working pressure prevailing in the working chamber and a pneumatic control pressure output at the controllable pressure converter; and
an analysis unit determining a pressure change over time which defines a pressure versus time pattern, wherein said pressure versus time pattern of the pressure change is compared to an expected pressure pattern based on saved empirical values of a faultlessly working open/closed-valve, and in case of exceeding a predetermined deviation tolerance of the pressure versus time pattern with respect to the expected pressure pattern an error signal is generated.

\* \* \* \* \*